(No Model.)
C. & A. B. LINN.
DUMPING WAGON.
No. 402,532. Patented Apr. 30, 1889.
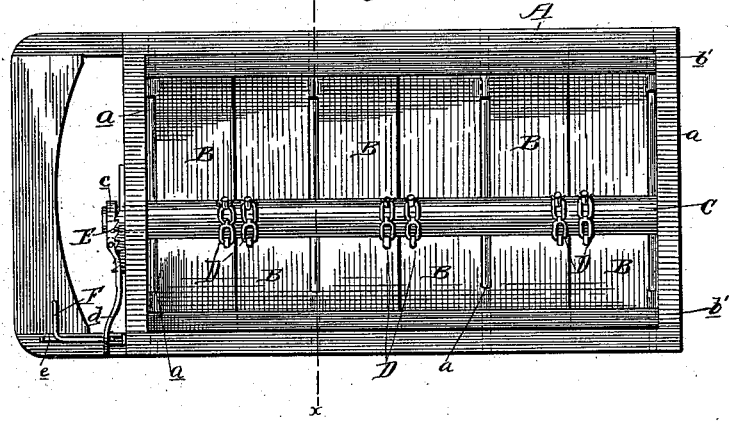
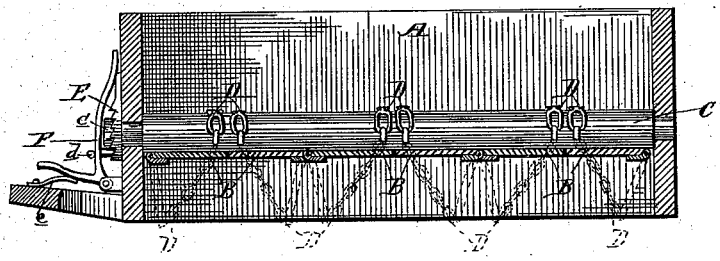
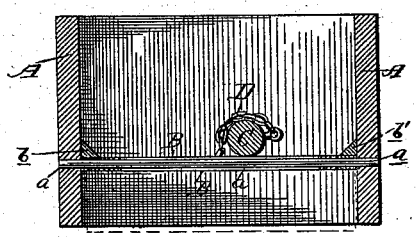
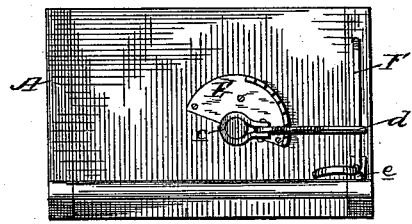
WITNESSES:
W. T. Robertson
INVENTORS
Chas. Linn
Andrew B. Linn
BY
ATTORNEY

UNITED STATES PATENT OFFICE.

CHARLES LINN AND ANDREW B. LINN, OF SIOUX CITY, IOWA.

DUMPING-WAGON.

SPECIFICATION forming part of Letters Patent No. 402,532, dated April 30, 1889.

Application filed August 23, 1888. Serial No. 283,516. (No model.)

*To all whom it may concern:*

Be it known that we, CHARLES LINN and ANDREW B. LINN, of Sioux City, in the county of Woodbury and State of Iowa, have invented certain new and useful Improvements in Dumping-Wagons; and we do hereby declare the following to be a full, clear, and exact description of the invention, such as will enable others skilled in the art to which it pertains to make and use the same.

Our invention relates to dumping-wagons in which the bottom or floor of the body consists of a series of hinged sections; and the object of the invention is to provide improved means for holding the sections in a raised or closed position and for instantly releasing said sections to let them drop to discharge the load.

A further object of the invention is to so arrange the hinged sections that they may be readily and conveniently applied to wagons of different lengths.

The invention consists in the combination, with a wagon-body, of a longitudinally-journaled shaft, a series of sections hinged transversely to the body, connections between the sections and shaft, and means, constructed as hereinafter described, for preventing the rotation of the latter.

In the drawings forming part of this specification, Figure 1 is a plan view of a dumping-wagon embodying our improvements. Fig. 2 is a longitudinal vertical section. Fig. 3 is a transverse section on the line *x x* of Fig. 1, and Fig. 4 is an end view.

Referring to the drawings, A represents the body of the wagon, in the sides of which, near the lower ends thereof, are mounted a series of rods, *a*.

B represents a series of sections or wings, which are journaled on the rods *a*, and which form the bottom of the wagon. When the wagon is loaded, these sections or wings are held in a horizontal position, and their upward movement beyond such position is prevented by stop-strips *b b'*, which are secured to the inner faces of the sides just above the rods *a*.

C represents a shaft, which extends the entire length of the wagon and is journaled in the ends thereof.

D represents chains, which are secured to the shaft C at one end and to the wings or sections at their other ends. The shaft C at its forward end is extended through the body of the wagon, and upon said extended end is mounted a clamp or collar, *c*, to which is pivoted an arm, *d*.

A ratchet-plate, E, is secured to the front part of the wagon, and the teeth of the said plate are adapted to be engaged by the pivoted arm *d*, and when the arm is in engagement with the teeth it is held in such position by the force exerted by the load on the shaft or by the weight of the wings or sections.

F represents a bell-crank foot-lever pivoted to the end of the wagon-body and held in operative position, as shown, by means of a spring, *e*, connecting its upper arm with the wagon-body, the pivoted rod *d*, when the hinged sections are closed, occupying a position directly in front of said upper arm.

The operation is as follows: The wagon being loaded, when it is desired to dump it (the wagon) the foot-lever is depressed at its lower end, which forces its upper end outwardly, this action causing the pivoted arm *d* to be forced from engagement with the ratchet-teeth. As soon as the arm *d* is released the shaft C is allowed to rotate, and this action is caused by the weight of the load on the sections, which forces them downwardly, thus discharging the load. After the load has been discharged the arm *d* is turned and engaged with the ratchet-teeth, thus rotating the shaft C and raising the sections through the chain-connections.

By the use of our improvements it will be seen that a load may be readily and quickly discharged without the necessity of dismounting from the wagon; also that by locating the sections and shaft as described the improvements may be applied to wagons as ordinarily constructed.

We claim—

The combination, with the wagon-body, of a bottom consisting of hinged wings, a shaft to which the wings are connected, a collar, *c*, secured upon the front end of the shaft, and an arm, $d$, secured to the collar, a ratchet-plate, E, a bell-crank lever, F, one arm of which is arranged behind the arm $d$, and a spring, $e$, arranged below the short arm of the bell-crank lever, substantially as set forth.

In testimony whereof we have signed this specification in the presence of two subscribing witnesses.

CHARLES LINN.
ANDREW B. LINN.

Witnesses:
J. P. BLOOD,
DAVID S. PHILLIPS.